United States Patent
Nguyen et al.

(10) Patent No.: US 9,516,117 B2
(45) Date of Patent: Dec. 6, 2016

(54) DYNAMIC SHIFTING OF SERVICE BUS COMPONENTS

(71) Applicant: Red Hat, Inc., Raleigh, NC (US)

(72) Inventors: Filip Nguyen, Brno (CZ); Filip Eliáš, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 633 days.

(21) Appl. No.: 13/972,581

(22) Filed: Aug. 21, 2013

(65) Prior Publication Data

US 2015/0058508 A1 Feb. 26, 2015

(51) Int. Cl.
| | |
|---|---|
| G06F 13/364 | (2006.01) |
| H04L 29/08 | (2006.01) |
| H04L 29/06 | (2006.01) |
| H04L 12/40 | (2006.01) |
| H04L 12/64 | (2006.01) |
| H04L 12/24 | (2006.01) |

(52) U.S. Cl.
CPC ............ *H04L 67/16* (2013.01); *G06F 13/364* (2013.01); *H04L 12/40* (2013.01); *H04L 12/40039* (2013.01); *H04L 12/6418* (2013.01); *H04L 67/42* (2013.01); *H04L 41/082* (2013.01)

(58) Field of Classification Search
CPC .............................. G06F 13/364; H04L 67/16
USPC .................................. 718/106; 717/114, 122
See application file for complete search history.

(56) References Cited

U.S. PATENT DOCUMENTS

| | | | | |
|---|---|---|---|---|
| 6,523,074 | B1 * | 2/2003 | Dianda | ............... G06F 13/4022 |
| | | | | 710/100 |
| 7,814,226 | B2 | 10/2010 | Patrick | |
| 7,986,707 | B2 | 7/2011 | Dettori et al. | |
| 8,004,974 | B2 | 8/2011 | Pavlick | |
| 2006/0036463 | A1 | 2/2006 | Patrick et al. | |
| 2008/0189679 | A1 | 8/2008 | Rodriguez et al. | |
| 2010/0082737 | A1 | 4/2010 | Dankle et al. | |

OTHER PUBLICATIONS

Keen, Martin et al, Patterns: Integrating Enterprise Service Buses in a Service-Oriented Architecture, Redbooks IBM International Technical Support Organization, Nov. 2005, first edition, International Business Machines Corporation.

(Continued)

*Primary Examiner* — Glenn A Auve
(74) *Attorney, Agent, or Firm* — Haynes and Boone, LLP

(57) ABSTRACT

Systems and methods are disclosed for processing messages using a dynamic messaging bus. An example system includes a plurality of services residing in a dynamic messaging bus including a plurality of sub-buses. Each service is assigned to a sub-bus of the plurality of sub-buses. The example system also includes a performance monitoring module that monitors a performance of one or more services executing on a sub-bus to which the respective one or more services is assigned. A first service is assigned to a first sub-bus and a second service is assigned to a second sub-bus. The example system further includes a swapping module that determines, based on the monitored performances of the first and second services, whether to swap the assignments of the first and second services such that the first service is assigned to the second sub-bus and the second service is assigned to the first sub-bus.

20 Claims, 7 Drawing Sheets

(56) References Cited

OTHER PUBLICATIONS

Kruessmann, Tobias, et al., High Availability: Evaluating Open Source Enterprise Service Buses, Proceedings of the ITI 2009 31$^{st}$ Int. Conf. on Information Technology interfaces, Jun. 22-25, 2009, Cavtat, Croatia, pp. 615-620.
Chappell, David A., Enterprise Service Bus, Theory in Practice; Jun. 2004, first edition, O'Reilly Media, Inc.,Sebastopol, California, USA.

* cited by examiner

```
<?xml version="1.0" encoding="UTF-8"?>
<jbossesb>
    <providers>
        <jms-provider name="JBossMQ" connection-factory="ConnectionFactory">
            <jms-bus busid="ServiceAInputQueue">
            <jms-message-filter dest-type="QUEUE" dest-name="queue/ServiceAInputQueue" />
            </jms-bus>
            <jms-bus busid="ServiceBInputQueue">
            <jms-message-filter dest-type="QUEUE" dest-name="queue/ServiceBInputQueue" />
            </jms-bus>
            <jms-bus busid="ServiceDInputQueue">
            <jms-message-filter dest-type="QUEUE" dest-name="queue/ServiceDInputQueue" />
            </jms-bus>
            <jms-bus busid="ServiceDInputQueue">
            <jms-message-filter dest-type="QUEUE" dest-name="queue/ServiceEInputQueue" />
            </jms-bus> </jms-provider> </providers>
    <services>                                                                    310
        <service subBus="202" name="Servicell2A" servicePeerGroup="210">
        <listeners>
            <jms-listener name="ServiceAInputQueue" busidref="ServiceAInputQueue" />
        </listeners>
        <actions mep="RequestResponse">
        <action name="SendToEmailServer1"
class="org.jboss.soa.esb.actions.EmailAction">
                <property name="provider" value="Server1" />
            </action>
            <action name="router" class="org.jboss.soa.esb.actions.Router">
                <property destination="ServiceDInputQueue" />       312
            </action> </actions> </service>
        <service subBus="204" name="Servicell2B" servicePeerGroup="210">
```

```
                <listeners>
                    <jms-listener name="ServiceBInputQueue"
busidref="ServiceBInputQueue" />
                </listeners>
                <actions mep="RequestResponse">
                    <action name="SendToEmailServer2"
class="org.jboss.soa.esb.actions.EmailAction">
                        <property name="provider" value="Server2" />
                    </action>
                    <action name="router"
class="org.jboss.soa.esb.actions.Router">
                        <property destination="ServiceEInputQueue" />
                    </action> </actions> </service>         314
<service subBus="202" name="ServiceH20" servicePeerGroup="212">
                <listeners>
                    <jms-listener name="ServiceDInputQueue"
busidref="ServiceDInputQueue" />
                </listeners>
                <actions mep="RequestResponse">
                    <action name="webserviceClientCXF"
class="org.jboss.soa.esb.actions.WebserviceClient">
                        <property url="https://cxf.redhat.com/
show_product.cgi?id=950666" />
                    </action>
                    <action name="router"
class="org.jboss.soa.esb.actions.Router">
                        <property destination="ServiceGInputQueue" />
                    </action>
                </actions>
            </service>
```

FIG. 3B

DYNAMIC SHIFTING OF SERVICE BUS COMPONENTS

BACKGROUND

The present disclosure generally relates to a messaging bus, and more particularly to dynamic shifting of services in a messaging bus.

Service Oriented Architecture (SOA) is a popular architectural paradigm for the development of software applications. For example, Web services provide the SOA to other applications via industry standard networks, interfaces, and protocols. The SOA is based on loosely-coupled and standards-based architectures. It is an approach to distributed computing that allows networked software resources to be leveraged. The SOA enables enterprises to integrate services, handle business events, and automate business processes more efficiently. For example, an SOA links information technology resources, data, services, and applications.

The SOA can include an enterprise service bus (ESB). An ESB is an underlying infrastructure for the SOA and implements the abstract design concept of the SOA. An ESB is a distributed middleware system for integrating Information Technology (IT) assets. The messaging bus in the ESB connects all services together. An ESB may be an event-driven and standards-based messaging engine that provides services for complex architectures. The ESB provides infrastructure that links together services and clients to enable distributed applications and processes. The ESB typically provides a service to a client using a service deployed on an ESB server at runtime. The ESB allows systems to interact through standard transports, such as file transfer protocol (FTP) and hypertext transfer protocol (HTTP), and to provide SOA-based applications. The ESB provides the capabilities of message handling, filtering, data transformation, content-based routing, and message repositories.

BRIEF SUMMARY

This disclosure relates to dynamic swapping of services residing in a messaging bus. Methods, systems, and techniques for processing messages using the messaging bus are provided.

According to an embodiment, a system for processing messages using a dynamic messaging bus includes a plurality of services residing in a dynamic messaging bus including a plurality of sub-buses. The plurality of sub-buses includes a first sub-bus and a second sub-bus separate from the first sub-bus, and each service of the plurality of services is assigned to a sub-bus of the plurality of sub-buses. The system also includes a performance monitoring module that monitors a performance of one or more services executing on a sub-bus to which the respective one or more services is assigned. A first service of the one or more services is assigned to the first sub-bus and a second service of the one or more services is assigned to the second sub-bus. The system further includes a swapping module that determines, based on the monitored performances of the first and second services, whether to swap the assignments of the first and second services such that the first service is assigned to the second sub-bus and the second service is assigned to the first sub-bus.

According to another embodiment, a method of processing messages using a dynamic messaging bus includes monitoring a performance of one or more services executing on a sub-bus to which the respective one or more services is assigned. The one or more services resides in a dynamic messaging bus including a plurality of sub-buses. A first service of the one or more services is assigned to a first sub-bus of the plurality of sub-buses, a second service of the one or more services is assigned to a second sub-bus of the plurality of sub-buses, and the first sub-bus is separate from the second sub-bus. The method also includes determining, based on the monitored performances, whether to swap the assignments of the first and second services such that the first service is assigned to the second sub-bus and the second service is assigned to the first sub-bus.

According to another embodiment, a non-transitory machine-readable medium includes a plurality of machine-readable instructions that when executed by one or more processors are adapted to cause the one or more processors to perform a method including: monitoring a performance of one or more services executing on a sub-bus to which the respective one or more services is assigned, the one or more services residing in a dynamic messaging bus including a plurality of sub-buses, where a first service of the one or more services is assigned to a first sub-bus of the plurality of sub-buses, a second service of the one or more services is assigned to a second sub-bus of the plurality of sub-buses, and the first sub-bus is separate from the second sub-bus; and determining, based on the monitoring, whether to swap the assignments of the first and second services such that the first service is assigned to the second sub-bus and the second service is assigned to the first sub-bus.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

FIGS. 3A-3C are a simplified example of a configuration file, according to an embodiment.

Embodiments of the present disclosure and their advantages are best understood by referring to the detailed description that follows.

DETAILED DESCRIPTION

I. Overview
II. Example System Architectures
III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The ESB may be used for client-server interactions and may provide infrastructure that links together services and clients to enable distributed applications and processes. The ESB may include one or more messaging busses that logically interconnect available services and clients. For example, the ESB may provide a service to the client using a service deployed on an ESB server at runtime. In an example, the ESB is deployed to an application server and then services are deployed to the ESB.

The ESB may provide the capabilities of message handling, filtering, data transformation, content-based routing, and message repositories. The execution of services residing in the ESB is typically sequential according to their position on the messaging bus. For example, when one service that is connected to the messaging bus is slow in execution, the whole ESB service may be slowed down. Accordingly, the processing of other critical requests may be delayed.

It may be desirable to maximize the processing speed of critical requests in a messaging bus. This may be difficult because integration that is happening in the messaging bus may take a lot of time and various factors may come into play (e.g., different load during different times of the day in specific time zones). The present disclosure provides a dynamic messaging bus that may be used to maximize the processing speed of requests so that critical requests can be processed in the shortest possible time.

II. Example System Architectures

Figure 1:
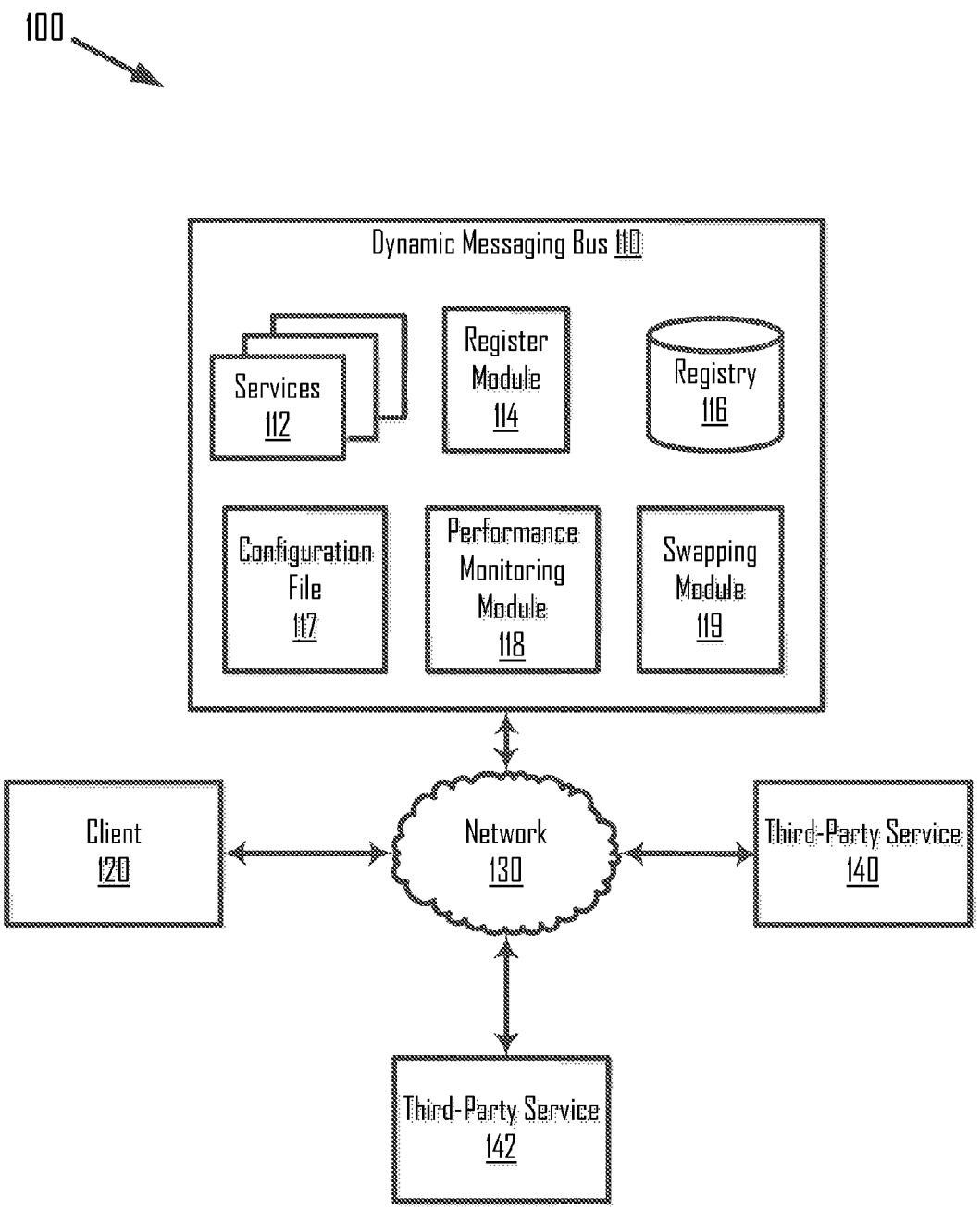
FIG. 1 is a simplified block diagram illustrating a system for processing messages using a dynamic messaging bus, according to an embodiment.

FIG. 1 is a simplified block diagram 100 illustrating a system for processing messages using a dynamic messaging bus, according to an embodiment. Diagram 100 includes a dynamic messaging bus 110, a client 120, a third-party service 140, and a third-party service 142 coupled over a network 130. Dynamic messaging bus 110 may allow software components to find and invoke each other irrespective of the technology used in their implementations. In an embodiment, dynamic messaging bus 110 is an ESB.

Network 130 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Although one client and two third-party services are illustrated, other embodiments including more than one client and/or more than two third-party services are within the scope of the present disclosure. Likewise, although one dynamic messaging bus is illustrated, other embodiments including more than one dynamic messaging bus are within the scope of the present disclosure.

A plurality of services 112 reside in dynamic messaging bus 110. In an embodiment, clients (e.g., client 120) and services (e.g., services 112) bind to dynamic messaging bus 110 and perform interactions through dynamic messaging bus 110. A service of plurality of services 112 may be included in a product (e.g., dynamic messaging bus 110) in a concrete implementation. A service may refer to a software component that is able to accomplish a task. The software component may be configurable. In an example, a service residing in dynamic messaging bus may be configured to access third-party services (e.g., third-party service 140) over network 130. For example, client 120 may send a message to dynamic messaging bus 110 that invokes one or more services of plurality of services 112 residing in dynamic messaging bus 110. The invoked service residing in dynamic messaging bus 110 may call to third-party service 140 to complete a task responsive to the message. In another example, a service residing in dynamic messaging bus may be configured to store files onto a file system, write data to or read data from a database, access a file transfer protocol (FTP) server to download files, or send an e-mail.

Dynamic messaging bus 110 may include a plurality of sub-buses. A service may be reusable across different sub-buses. Dynamic messaging bus 110 may maintain separated sub-buses that have different priority rankings Each of the sub-buses may be separate from each other, and each sub-bus may have a priority ranking relative to each other. A sub-bus assigned a high priority ranking may be tasked with processing critical requests, and services with the best performance within a common service peer group may be dynamically assigned to the sub-bus that is assigned the high priority ranking.

Figure 2:
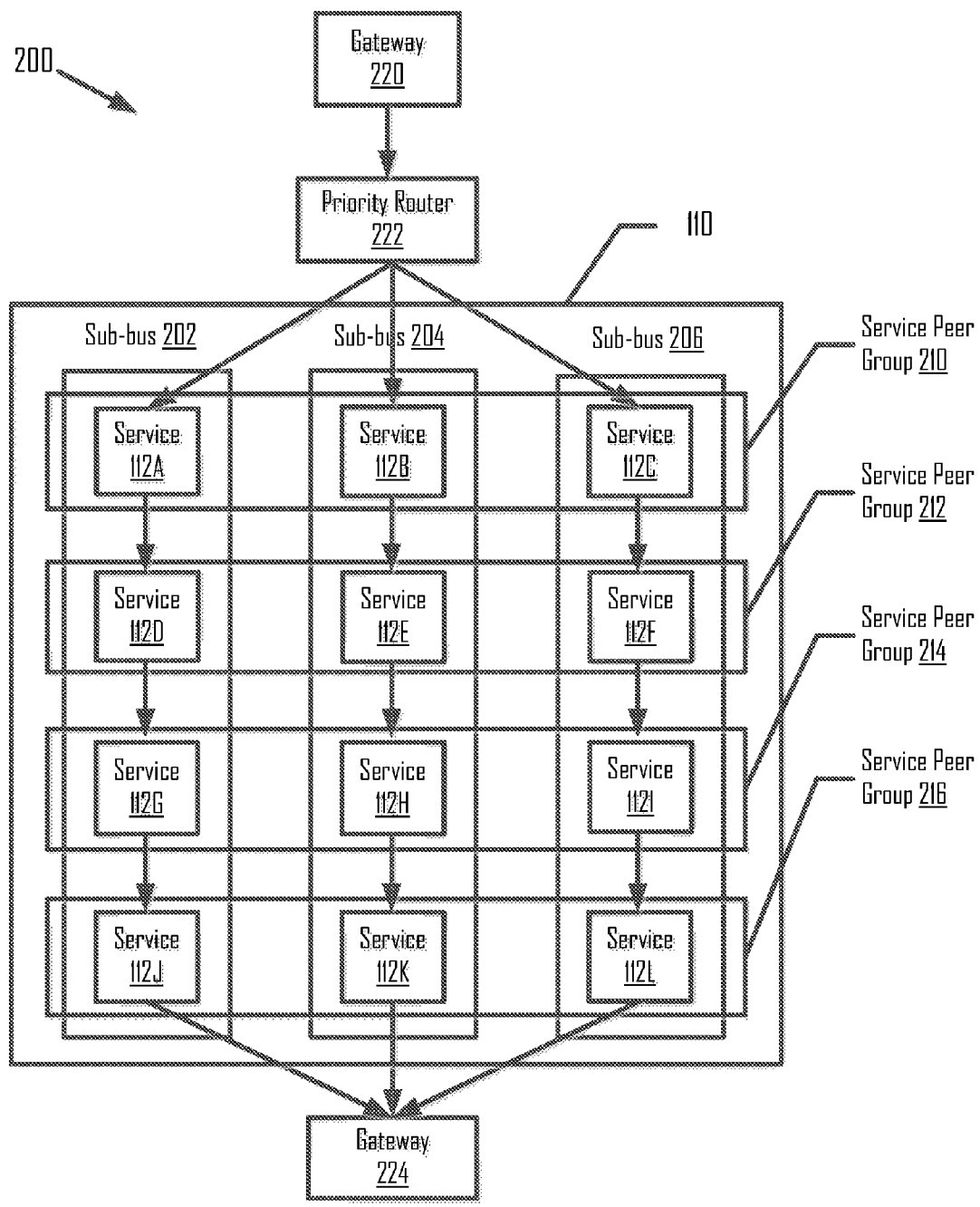
FIG. 2 is a simplified block diagram illustrating a dynamic messaging bus including a plurality of sub-buses and a plurality of service peer groups, according to an embodiment.

FIG. 2 is a simplified block diagram 200 illustrating a dynamic messaging bus including a plurality of sub-buses, according to an embodiment. In FIG. 2, dynamic messaging bus 110 includes three sub-buses 202, 204, and 206. Although three sub-buses are illustrated, other embodiments including fewer than or more than three sub-buses are within the scope of the present disclosure. Sub-bus 202 includes services 112A, 112D, 112G, and 112J. Sub-bus 204 includes services 112B, 112E, 112H, and 112K. Sub-bus 206 includes services 112C, 112F, 112I, and 112L. Although each sub-bus is illustrated as including four services, this is not intended to be limiting and any sub-bus may include fewer than or more than four services.

Each sub-bus is responsible for processing a workload and may be thought of as a pipeline. In FIG. 2, a gateway 220 receives a message from a client (e.g., client 120) and converts the message into a standard format that dynamic messaging bus 110 understands. Gateway 220 may pass the message in the standard format to a priority router 222. Priority router 222 determines a priority of the message and sends the message to the appropriate sub-bus based on the determined priority of the message. Priority router 222 may determine the message priority using various techniques. In an example, priority router 222 may determine the message priority by using JAVA® Messaging Service priority, HTTP method, or user identifier associated with the sender of the message. Trademarks are the property of their respective owners. In another example, priority router 222 may determine the message priority based on content in the message.

In an example, sub-bus 202 has a high priority ranking, sub-bus 204 has an average priority ranking, and sub-bus 206 has a low priority ranking. Accordingly, priority router 222 may pass a message having a high priority to sub-bus 202, may pass a message having an average priority to sub-bus 204, and may pass a message having a low priority to sub-bus 206. In this way, messages may be processed based on their priority. The critical requests may be processed with the best available performance time, and delays in processing these critical requests may be mitigated or avoided by sending non-critical requests to another sub-bus for processing. Priority router 222 may be configured by an administrator with knowledge of the relative priority rankings of the sub-buses.

The message may be sequentially processed by each service in the sub-bus. For example, service 112A in sub-bus 202 is at a beginning of the pipeline and receives the message. The message may first be processed by service 112A, then by service 112D, then by service 112G, and then by service 112J. For example, service 112A may process the message and send an output to service 112D, and so on until service 112J has finished processing the message. Each service may perform some type of processing on the message. Service 112J sends an output to a gateway 224, and gateway 224 sends the result to the client. The services residing in the sub-bus may integrate different third-party services to assist in processing the workload. For example, service 112A may call a Web service for a specific purpose (e.g., retrieve stock information).

Each service of plurality of services 112 may be assigned to a sub-bus of the plurality of sub-buses residing in dynamic messaging bus 110. A service executes on a sub-bus to which the service is assigned. The sub-bus in which a service is included may refer to the sub-bus to which the service is assigned. For example, in FIG. 2, services 112A, 112D, 112G, and 112J are assigned to sub-bus 202 and execute on sub-bus 202. Similarly, services 112B, 112F, 112H, and 112K are assigned to sub-bus 204 and execute on sub-bus 204. Similarly, services 112C, 112E, 112I, and 112L are assigned to sub-bus 206 and execute on sub-bus 206.

Dynamic messaging bus 110 also includes service peer groups 210, 212, 214, and 216. Each service peer group includes two or more services, and each service may be assigned to a service peer group. Services 112A, 112B, and 112C are assigned to a common service peer group 210. Services 112D, 112E, and 112F are assigned to a common service peer group 212. Services 112G, 112H, and 112I are assigned to a common service peer group 214. Services 112J, 112K, and 112L are assigned to a common service peer group 216. Each service assigned to a common service peer group has a common functionality. In an embodiment, services in a common service peer group are identical internal services that call third-party services located on different nodes. Services within a common service group may be thought of as being similar services with the same service contracts. The services within a common service peer group may have the same contract of service but may have different providers or implementations from each other. Thus, although the services within a common service peer group have a common functionality, the performances of these services may differ.

Swapping services may be beneficial because each service in a common service peer group may have different processing speeds. For example, in FIGS. 1 and 2, service 112A may call third-party service 140 to retrieve stock information, and service 112B may call third-party service 142 (rather than third-party service 140) to retrieve stock information. The processing speed of services 112A and 112B may vary if third-party service 140 is, for example, located on a different server than third-party service 142 or if third-party services 140 and 142 are located on the same server but have different implementations. The third-party services may have different performance characteristics because, for example, these services are implemented on different computing devices or implemented differently. Services that are in a common service peer group and assigned to different sub-buses may be switched between the sub-buses on which the services are residing. In this way, a particular sub-bus may include the fastest performing services within a common service peer group. Further, each of sub-buses 202, 204, and 206 may operate in parallel. In an example, execution of services residing in a sub-bus is performed independently from execution of services residing in a separate sub-bus. Further, the execution of services residing in separate sub-buses may be performed concurrently.

Referring back to FIG. 1, dynamic messaging bus 110 also includes a performance monitoring module 118 and a swapping module 119. Performance monitoring module 118 may monitor the activity of a service and/or a sub-bus. In an embodiment, performance monitoring module 118 monitors a performance of one or more services executing on a sub-bus to which the respective one or more services is assigned. Swapping module 119 may determine, based on the monitored performances of the one or more services, whether to swap the assignments of any services within a common service peer group such that the swapped services are assigned to the sub-bus of the other.

Performance monitoring module 118 may generate statistics or characteristics of a sub-bus. Performance monitoring module 118 may monitor the performance of the one or more services by determining an average performance of the one or more services. In an embodiment, to determine an average performance of a respective service, performance monitoring module 118 identifies a timeframe to monitor the respective service in the common service peer group and determines a processing time for a quantity of messages received by the respective service during the timeframe. Performance monitoring module 118 calculates a sum of the processing times for the received messages by the respective service and divides the sum by the quantity of received messages.

In an embodiment, performance monitoring module 118 may determine the average performance of the respective service by implementing the routine in Table A.

TABLE A

Input: time_window: How long performance will be measured in each run.
Input: sampling: Which messages will be counted (e.g., every 10th message)
  1. end_time = start_time + time_window
  2. Wait for message
  3. If (message_number % sampling == 0 ) go to action 4 else go to action 2
  4. process_start:=arrivalTime(message)
  5. process_end:=messageProcessed(message)
  6. $t_{messageid}$=process_end − process_start
  7. if (actual_time < end_time) go to action 2 else go to action 8
  8. for each service k, $p_k = \dfrac{\sum_{i=1}^{n} t_i}{n}$, where n = number of measured messages Output: pk : Average performance of service k.

Performance monitoring module 118 may implement the routine in Table A for each service peer group and for each service in the respective service peer group. The routine in Table A may be continuously implemented so that performance monitoring module 118 is kept up to date with the performance of services.

In an embodiment, performance monitoring module 118 creates a vector including the average performance of each service in the common service peer group. Performance monitoring module 118 may create a vector of all services that are in a common service peer group $P=(p_1, p_2, \ldots, p_x)$, where x is the quantity of services in the service peer group. The vector P may be created for each service peer group. The routine in Table A has a time window length. After the routine in Table A is executed, performance monitoring module 118 may compute the vector P after the time window length has elapsed. The vector may correspond to the average speed of each service for each service peer group. Performance monitoring module 118 may order, based on the average performances of the services, the services in the vector. Performance monitoring module 118 may reassign services in the common service peer group to another sub-bus based on a position of the respective service in the vector.

In an embodiment, swapping module 119 determines whether to dynamically swap services by implementing the routine in Table B.

TABLE B

Input: Vector P
1. i=1
2. for each element p1 to px−1 in vector P do
3. if(pk,i < pk,i+1) then swap pi and pi+1 in vector P
4. i++
5. done
6. Assign members of service peer group to sub-buses according to their positions in vector P The routine in Table B may be performed for each service peer group. After a few runs, sub-bus 202 may contain only top performance services so that critical requests may be processed the fastest way via sub-bus 202. Non-critical requests may be processed by the other sub-buses according to their relative priority rankings.

After the routine in Table A is finished executing, the routine in Table B may begin execution. After the routine in Table B is finished executing, the routine in Table A may begin execution. The routines in Tables A and B may be continually executed so that the sub-bus with the high priority ranking will continue to include the best performing services.

Swapping module 119 may determine whether to swap the assignments of services within a common service peer group based on the average performances of the services and a priority ranking of the plurality of sub-buses relative to each other. In an example, performance monitoring module 118 monitors a performance of service 112A executing on sub-bus 202 and a performance of service 112B executing on sub-bus 204. In keeping with the example illustrated in FIG. 2, service 112A is assigned to sub-bus 202 and service 112B is assigned to sub-bus 204. Swapping module 119 may determine, based on the monitored performances of services 112A and 112B, whether to swap the assignments of services 112A and 112B such that service 112A is assigned to sub-bus 204 and service 112B is assigned to sub-bus 202. Swapping module 119 swaps the assignments of services 112A and 112B based on the determination. In an embodiment, only swapped services within a common service peer group and that reside in adjacent sub-buses may be swapped. In another embodiment, any services within a common service peer group may be swapped. For brevity, two services are described as being compared and swapped. This is not intended to be limiting, and other embodiments including more than two services being compared and potentially swapped are within the scope of the present disclosure.

In an example, sub-bus 202 has a higher priority ranking than sub-bus 204. When the performance of service 112B is better than the performance of service 112A, swapping module 119 determines to swap the assignments of services 112A and 112B in relation to their assigned sub-buses. After swapping module 119 swaps the assignments of services 112A and 112B, service 112A is assigned to sub-bus 204 and service 112B is assigned to sub-bus 202. Accordingly, when service 112A executes, it will execute on sub-bus 204. Similarly, when service 112B executes, it will execute on sub-bus 202.

Dynamic assignment of services to sub-buses may be conducted at runtime. This may be advantageous because the performance of services can vary according to various factors such as time zone or load. In an example, a given service residing in dynamic messaging bus 110 may call a third-party service, which can be overloaded and slow during business hours. During this time in which the third-party service is slow, the given service may be assigned to a sub-bus different from the one assigned the high priority ranking. At a later point in time, however, the load on the third-party service may decrease, resulting in better performance compared to other services in the given service's common service peer group. During this time in which the third-party service exhibits fast performance, the given service may also exhibit fast performance and thus be assigned to the sub-bus with the high priority ranking. In an embodiment, each sub-bus is dynamic and may automatically swap services with another sub-bus as long as the swapped services are in a common service peer group.

Referring back to FIG. 1, dynamic messaging bus 110 also includes a register module 114, a registry 116, and a configuration file 117. In an embodiment, register module 114 registers plurality of services 112 and stores the registration information associated with the registered services into registry 116. A service may publish itself into registry 116 along with, for example, its assignment information. In an example, the registration information of a service may include the sub-bus to which the service is assigned and the service peer group to which the service is assigned.

In an embodiment, when swapping module 119 swaps the assignments of services 112A and 112B, swapping module 119 modifies the assignment information in registry 116. In an example, service 112A's registration information states that service 112A is assigned to sub-bus 202 and service peer group 210, and service 112B's registration information states that service 112B is assigned to sub-bus 204 and service peer group 210. To swap the assignments of services 112A and 112B in relation to their assigned sub-buses, swapping module 119 may modify registry 116 such that service 112A's registration information states that service 112A is assigned to sub-bus 204 and service 112B's registration information states that service 112B is assigned to sub-bus 202.

Figure 3C:
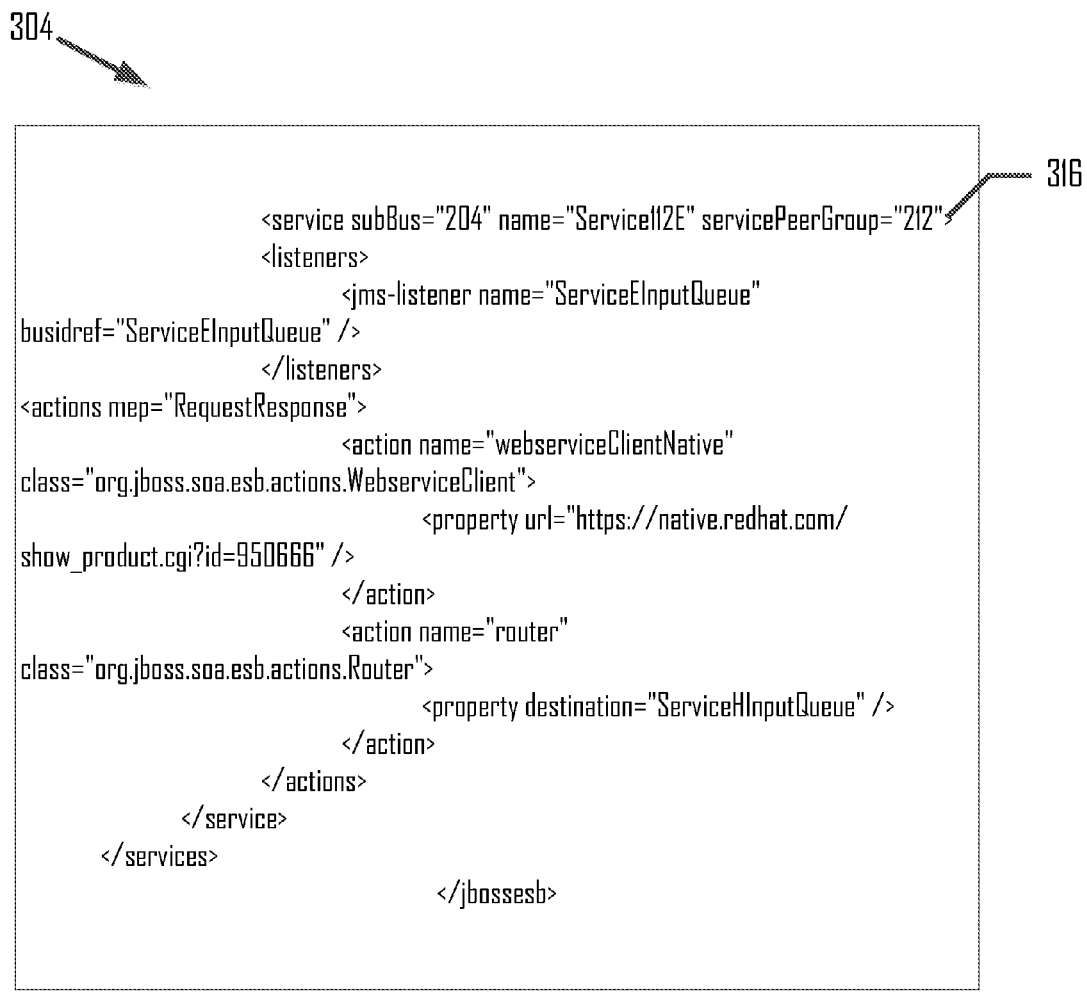

Configuration file 117 may also define one or more services as being assigned to a sub-bus and further define the one or more services as being assigned to a service peer group. An administrator may incorporate the assignment information into configuration file 117. In an example, configuration file 117 is an Extensible Markup Language (XML) file. FIGS. 3A-3C are a simplified example 300, 302, 304 of configuration file 117, according to an embodiment. In example 300, at a line referenced by reference number 310, service 112A is assigned to sub-bus 202 and to service peer group 210, and at a line referenced by reference number 312, service 112B is assigned to sub-bus 204 and to service peer group 210. In example 302, at a line referenced by reference number 314, service 112D is assigned to sub-bus 202 and to service peer group 212. In example 304, at a line referenced by reference number 316, service 112E is assigned to sub-bus 204 and to service peer group 212.

When swapping module 119 swaps the assignments of services 112A and 112B in relation to their assigned sub-buses, swapping module 119 may modify configuration file 117 such that configuration file 117 redefines service 112A as being assigned to sub-bus 204 and redefines service 112B as being assigned to sub-bus 202.

For example, configuration file 117 may be updated such that the line referenced by reference number 310 may read the following:

<service subBus="204" name="service112A" servicePeerGroup="210">;

Additionally, configuration file 117 may be updated such that the line referenced by reference number 312 may read the following:

<service subBus="202" name="service112B" servicePeerGroup="210">.

Swapping module 119 may modify registry 116 to include the updated assignment information before modifying configuration 117 to include the updated assignment information. In another example, swapping module 119 may modify registry 116 to include the updated assignment information after modifying configuration 117 to include the updated assignment information.

In an embodiment, services 112A-112L have input queues and output queues. In an example, service 112A includes a first input queue and a first output queue, and service 112B includes a second input queue and a second output queue. To swap the assignments of services 112 and 11B, swapping module 119 may swap the first input queue and the second input queue and further swap the first output queue and the second output queue.

The sub-buses and the quantity of sub-buses residing in dynamic messaging bus 110 may be configurable. In an example, the administrator may decide how many sub-buses to include in dynamic messaging bus 110.

As discussed above and further emphasized here, FIGS. 1, 2, 3A-3C are merely examples, which should not unduly limit the scope of the claims. For example, it should be understood that one or more modules (e.g., register module 114, performance monitoring module 118, and swapping module 119) may be combined with another module. In an example, performance monitoring module 118 and swapping module 119 are combined into one module. It should also be understood that a module may be separated into more than one module. In an example, performance monitoring module 118 is split into a first performance monitoring module that monitors a first sub-bus residing in the dynamic messaging bus and into a second performance monitoring module that monitors a second sub-bus residing in the dynamic messaging bus.

III. Example Method

Figure 4:
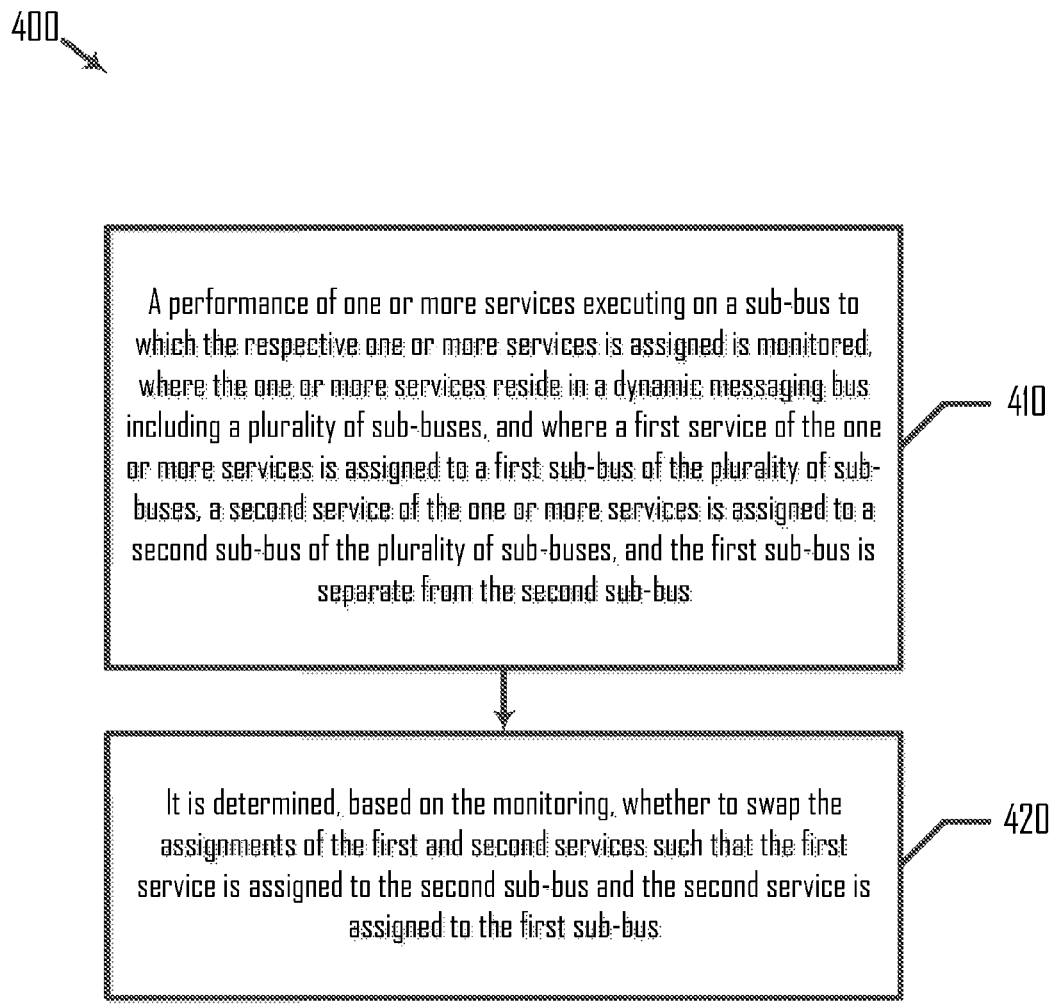
FIG. 4 is a simplified flowchart illustrating a method of processing messages using a dynamic messaging bus, according to an embodiment.

FIG. 4 is a simplified flowchart illustrating a method 400 of processing messages using a dynamic messaging bus, according to an embodiment. Method 400 is not meant to be limiting and may be used in other applications.

Method 400 includes steps 410-420. In a step 410, a performance of one or more services executing on a sub-bus to which the respective one or more services is assigned is monitored, where the one or more services reside in a dynamic messaging bus including a plurality of sub-buses, and where a first service of the one or more services is assigned to a first sub-bus of the plurality of sub-buses, a second service of the one or more services is assigned to a second sub-bus of the plurality of sub-buses, and the first sub-bus is separate from the second sub-bus. In an example, performance monitoring module 118 monitors a performance of one or more services executing on a sub-bus to which the respective one or more services is assigned, where the one or more services residing in a dynamic messaging bus including a plurality of sub-buses, and where a first service of the one or more services is assigned to a first sub-bus of the plurality of sub-buses, a second service of the one or more services is assigned to a second sub-bus of the plurality of sub-buses, and the first sub-bus is separate from the second sub-bus In a step 420, it is determined, based on the monitoring, whether to swap the assignments of the first and second services such that the first service is assigned to the second sub-bus and the second service is assigned to the first sub-bus. In an example, swapping module 119 determines, based on the monitoring, whether to swap the assignments of the first and second services such that the first service is assigned to the second sub-bus and the second service is assigned to the first sub-bus.

It is also understood that additional method steps may be performed before, during, or after steps 410-420 discussed above. It is also understood that one or more of the steps of method 400 described herein may be omitted, combined, or performed in a different sequence as desired.

IV. Example Computing System

Figure 5:
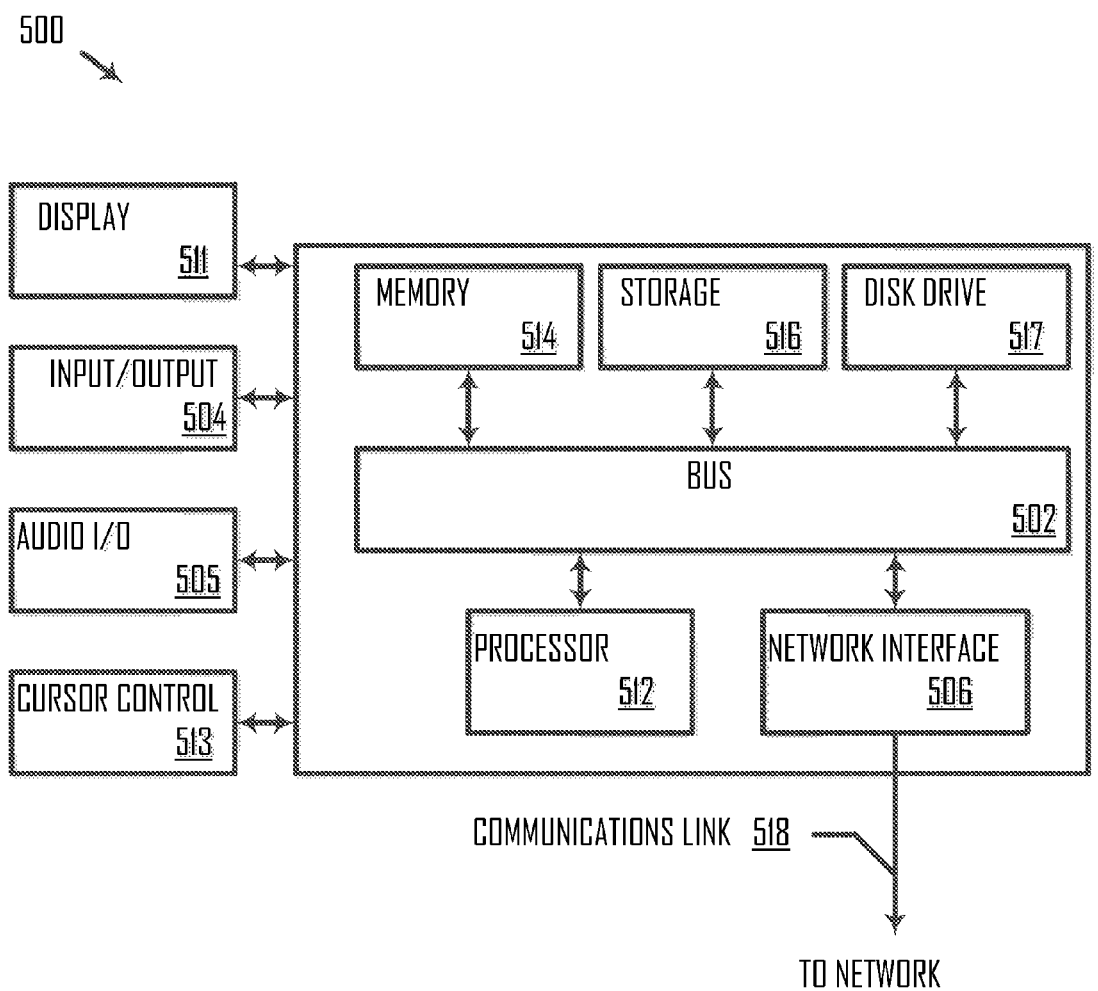
FIG. 5 is a block diagram of an electronic system suitable for implementing one or more embodiments of the present disclosure.

FIG. 5 is a block diagram of a computer system 500 suitable for implementing one or more embodiments of the present disclosure. In various implementations, dynamic messaging bus 110 may execute on a server computing device. The server computing device may include one or more processors. The server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 512, which may be a microcontroller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A system for processing messages using a dynamic messaging bus, the system comprising:
    a plurality of services residing in a dynamic messaging bus including a plurality of sub-buses, wherein the plurality of sub-buses includes a first sub-bus and a second sub-bus separate from the first sub-bus, and each service of the plurality of services is assigned to a sub-bus of the plurality of sub-buses;
    a performance monitoring module that monitors a performance of one or more services executing on a sub-bus to which the respective one or more services is assigned, wherein a first service of the one or more services is assigned to the first sub-bus and a second service of the one or more services is assigned to the second sub-bus; and
    a swapping module that determines, based on the monitored performances of the first and second services, whether to swap the assignments of the first and second services such that the first service is assigned to the second sub-bus and the second service is assigned to the first sub-bus.

2. The system of claim 1, wherein the swapping module swaps the assignments of the first and second services based on the determination.

3. The system of claim 2, wherein the first sub-bus is adjacent to the second sub-bus.

4. The system of claim 1, wherein the first and second services are assigned to a common service peer group, and each service assigned to a common service peer group has a common functionality.

5. The system of claim 4, wherein the first sub-bus has a priority ranking relative to the second sub-bus.

6. The system of claim 5, wherein the first sub-bus has a higher priority ranking than the second sub-bus, and when an average message processing time of the second service is better than an average message processing time of the first service, the swapping module determines to swap the assignments of the first and second services, and
    wherein after the swapping module swaps the assignments of the first and second services, the first service is assigned to the second sub-bus and the second service is assigned to the first sub-bus.

7. The system of claim 4, wherein services in the common service peer group are identical internal services that are located on different nodes.

8. The system of claim 1, further comprising:
    a configuration file that defines one or more services as being assigned to a sub-bus and further defines the one or more services as being assigned to a service peer group, wherein each service assigned to a common service peer group has a common functionality, and wherein the configuration file redefines the first service as being assigned to the first sub-bus and redefines the second service as being assigned to the second sub-bus.

9. The system of claim 8, wherein the swapping module modifies, based on the determination, the configuration file such that the configuration file defines the first service as being assigned to the second sub-bus and the second service as being assigned to the first sub-bus.

10. The system of claim 8, wherein the first service includes a first input queue and a first output queue, and the second service includes a second input queue and a second output queue, and the swapping module swaps the first input queue and the second input queue and swaps the first output queue and the second output queue.

11. A method of processing messages using a dynamic messaging bus, the method comprising:
   monitoring a performance of one or more services executing on a sub-bus to which the respective one or more services is assigned, the one or more services residing in a dynamic messaging bus including a plurality of sub-buses,
   wherein a first service of the one or more services is assigned to a first sub-bus of the plurality of sub-buses, a second service of the one or more services is assigned to a second sub-bus of the plurality of sub-buses, and the first sub-bus is separate from the second sub-bus; and
   determining, based on the monitoring, whether to swap the assignments of the first and second services such that the first service is assigned to the second sub-bus and the second service is assigned to the first sub-bus.

12. The method of claim 11, wherein the first and second services are assigned to a common service peer group, and each service assigned to a common service peer group has a common functionality.

13. The method of claim 12, further comprising:
   swapping the assignments of the first and second services based on the determining.

14. The method of claim 13, wherein the swapping includes modifying a configuration file that defines the first service as being assigned to the first sub-bus, the second service as being assigned to the second sub-bus, and the first and second services as being assigned to a common service peer group,
   wherein the modifying a configuration file includes redefining the first service as being assigned to the second sub-bus and redefining the second service as being assigned to the first sub-bus.

15. The method of claim 11, wherein the monitoring includes for each service of the one or more services, determining an average performance of the respective service.

16. The method of claim 15, wherein the determining an average performance includes:
   identifying a timeframe to monitor the respective service in the common service peer group,
   determining a processing time for a quantity of messages received by the respective service during the timeframe,
   calculating a sum of the processing times for the received messages by the respective service, and
   dividing the sum by the quantity of received messages.

17. The method of claim 16, further including:
   creating a vector including the average performance of each service in the common service peer group.

18. The method of claim 17, further comprising:
   ordering, based on the average performances of the services, the services in the vector; and
   reassigning services in the common service peer group based on a position of the respective service in the vector.

19. The method of claim 16, wherein the determining whether to swap includes determining whether to swap based on the average performances and a priority ranking of the plurality of sub-buses relative to each other.

20. A non-transitory machine-readable medium comprising a plurality of machine-readable instructions that when executed by one or more processors are adapted to cause the one or more processors to perform a method comprising:
   monitoring a performance of one or more services executing on a sub-bus to which the respective one or more services is assigned, the one or more services residing in a dynamic messaging bus including a plurality of sub-buses,
   wherein a first service of the one or more services is assigned to a first sub-bus of the plurality of sub-buses, a second service of the one or more services is assigned to a second sub-bus of the plurality of sub-buses, and the first sub-bus is separate from the second sub-bus; and
   determining, based on the monitoring, whether to swap the assignments of the first and second services such that the first service is assigned to the second sub-bus and the second service is assigned to the first sub-bus.

* * * * *